US009066016B2

(12) United States Patent
Morimoto et al.

(10) Patent No.: US 9,066,016 B2
(45) Date of Patent: Jun. 23, 2015

(54) APPARATUS, METHOD, AND PROGRAM FOR SELECTING IMAGE DATA USING A DISPLAY

(71) Applicant: Sony Corporation, Tokyo (JP)

(72) Inventors: Tetsuo Morimoto, Kanagawa (JP); Katsuhiko Watanabe, Saitama (JP); Kenichiro Imai, Kanagawa (JP); Kou Kobayashi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/737,281

(22) Filed: Jan. 9, 2013

(65) Prior Publication Data

US 2013/0120634 A1 May 16, 2013

Related U.S. Application Data

(60) Division of application No. 12/948,130, filed on Nov. 17, 2010, now abandoned, which is a continuation of application No. 11/637,685, filed on Dec. 12, 2006, now Pat. No. 7,929,029.

(30) Foreign Application Priority Data

Dec. 28, 2005 (JP) ................................ P2005-380371

(51) Int. Cl.
*H04N 5/77* (2006.01)
*H04N 5/225* (2006.01)
(Continued)

(52) U.S. Cl.
CPC .......... *H04N 5/23293* (2013.01); *G11B 27/034* (2013.01); *G11B 27/329* (2013.01);
(Continued)

(58) Field of Classification Search
CPC ... H04N 5/772; H04N 2101/00; H04N 5/907; H04N 1/32128; H04N 2201/3264; H04N 1/2112; H04N 5/23293; H04N 5/232
USPC .................. 348/231.2–231.6, 333.02–333.05
See application file for complete search history.

(56) References Cited

U.S. PATENT DOCUMENTS

| 6,237,010 B1 | 5/2001 | Hui et al. |
| 6,301,586 B1 | 10/2001 | Yang et al. |

(Continued)

FOREIGN PATENT DOCUMENTS

| CN | 1417799 A | 5/2003 |
| CN | 1505394 | 6/2004 |

(Continued)

OTHER PUBLICATIONS

Office Action from Japanese Application No. 2005-380371, dated Jul. 15, 2010.

(Continued)

*Primary Examiner* — Aung S Moe
(74) *Attorney, Agent, or Firm* — Lerner, David, Littenberg, Krumholz & Mentlik, LLP

(57) ABSTRACT

An image recording apparatus includes an image capturing unit configured to capture an image of a subject, a recording unit configured to record one of still image data and video image data captured by the image capturing unit on a storage medium in the form of an image file, a generating unit configured to generate a management file used for managing the image file recorded on the storage medium, and a registering unit configured to register an identifier of the image file recorded on the storage medium in the management file on a capture date basis in the order of capture time.

17 Claims, 11 Drawing Sheets

(51) Int. Cl.

| | | |
|---|---|---|
| *H04N 5/232* | (2006.01) | |
| *G11B 27/034* | (2006.01) | |
| *G11B 27/32* | (2006.01) | |
| *H04N 1/21* | (2006.01) | |
| *H04N 1/32* | (2006.01) | |
| *H04N 21/433* | (2011.01) | |
| *H04N 1/00* | (2006.01) | |
| *H04N 5/781* | (2006.01) | |
| *H04N 5/85* | (2006.01) | |
| *H04N 5/907* | (2006.01) | |
| *H04N 9/79* | (2006.01) | |
| *H04N 9/804* | (2006.01) | |
| *H04N 9/82* | (2006.01) | |
| *H04N 101/00* | (2006.01) | |

(52) U.S. Cl.
CPC ........ *H04N1/00347* (2013.01); *H04N 1/00413* (2013.01); *H04N 1/00432* (2013.01); *H04N 1/00453* (2013.01); *H04N 1/00458* (2013.01); *H04N 1/00461* (2013.01); *H04N 1/00472* (2013.01); *H04N 1/2112* (2013.01); *H04N 1/212* (2013.01); *H04N 1/32112* (2013.01); *H04N 5/772* (2013.01); *H04N 5/781* (2013.01); *H04N 5/85* (2013.01); *H04N 5/907* (2013.01); *H04N 9/7921* (2013.01); *H04N 9/8042* (2013.01); *H04N 9/8047* (2013.01); *H04N 9/8205* (2013.01); *H04N 21/4334* (2013.01); *H04N 2101/00* (2013.01); *H04N 2201/0087* (2013.01); *H04N 2201/3225* (2013.01); *H04N 2201/3226* (2013.01); *H04N 2201/3247* (2013.01); *H04N 2201/3252* (2013.01); *H04N 2201/3277* (2013.01)

(56) References Cited

U.S. PATENT DOCUMENTS

| | | | |
|---|---|---|---|
| 6,683,649 B1 | 1/2004 | Anderson | |
| 7,286,256 B2* | 10/2007 | Herbert | 358/1.16 |
| 7,456,871 B2 | 11/2008 | Iida et al. | |
| 7,742,094 B2* | 6/2010 | Matsuno et al. | 348/333.05 |
| 2001/0056434 A1 | 12/2001 | Kaplan et al. | |
| 2003/0189652 A1 | 10/2003 | Takayama | |
| 2003/0221541 A1 | 12/2003 | Platt | |
| 2004/0109587 A1* | 6/2004 | Segawa et al. | 382/115 |
| 2004/0125150 A1* | 7/2004 | Adcock et al. | 345/810 |
| 2004/0179124 A1 | 9/2004 | Morimoto et al. | |
| 2004/0201774 A1 | 10/2004 | Gennetten | |
| 2004/0205286 A1* | 10/2004 | Bryant et al. | 711/1 |
| 2005/0050043 A1* | 3/2005 | Pyhalammi et al. | 707/7 |
| 2005/0080769 A1* | 4/2005 | Gemmell et al. | 707/7 |
| 2005/0190415 A1 | 9/2005 | Ueda | |
| 2005/0210411 A1* | 9/2005 | Morita | 715/825 |
| 2006/0078315 A1* | 4/2006 | Wada et al. | 386/117 |
| 2006/0092291 A1 | 5/2006 | Bodie | |
| 2006/0119714 A1 | 6/2006 | Tamura et al. | |
| 2006/0184966 A1 | 8/2006 | Hunleth et al. | |
| 2006/0187331 A1 | 8/2006 | Watanabe et al. | |
| 2006/0239676 A1* | 10/2006 | Parulski et al. | 396/287 |
| 2006/0244847 A1 | 11/2006 | Nagaoka et al. | |
| 2007/0077034 A1* | 4/2007 | Okuyama et al. | 386/112 |
| 2007/0139534 A1* | 6/2007 | Tsushio et al. | 348/231.99 |
| 2008/0309795 A1 | 12/2008 | Mitsuhashi et al. | |
| 2010/0177233 A1* | 7/2010 | Tanaka et al. | 348/333.02 |

FOREIGN PATENT DOCUMENTS

| | | |
|---|---|---|
| CN | 1610904 A | 4/2005 |
| CN | 1707479 A | 12/2005 |
| JP | 11-215457 A | 8/1999 |
| JP | 11215474 A | 8/1999 |
| JP | 2000-270347 A | 9/2000 |
| JP | 2001119653 A | 4/2001 |
| JP | 2004032503 A | 1/2004 |
| JP | 2004187066 A | 7/2004 |
| JP | 2004-227630 A | 8/2004 |
| JP | 2005-027159 A | 1/2005 |
| JP | 2005020070 A | 1/2005 |
| JP | 2005033831 A | 2/2005 |
| JP | 2005-086737 A | 3/2005 |
| JP | 2005244614 A | 9/2005 |
| JP | 2005295374 A | 10/2005 |
| JP | 2005304058 A | 10/2005 |

OTHER PUBLICATIONS

Office Action from Japanese Application No. 2005-380371, dated Mar. 10, 2011.

Office Action from Chinese Application No. 2012-10215310.6, dated May 5, 2014.

\* cited by examiner

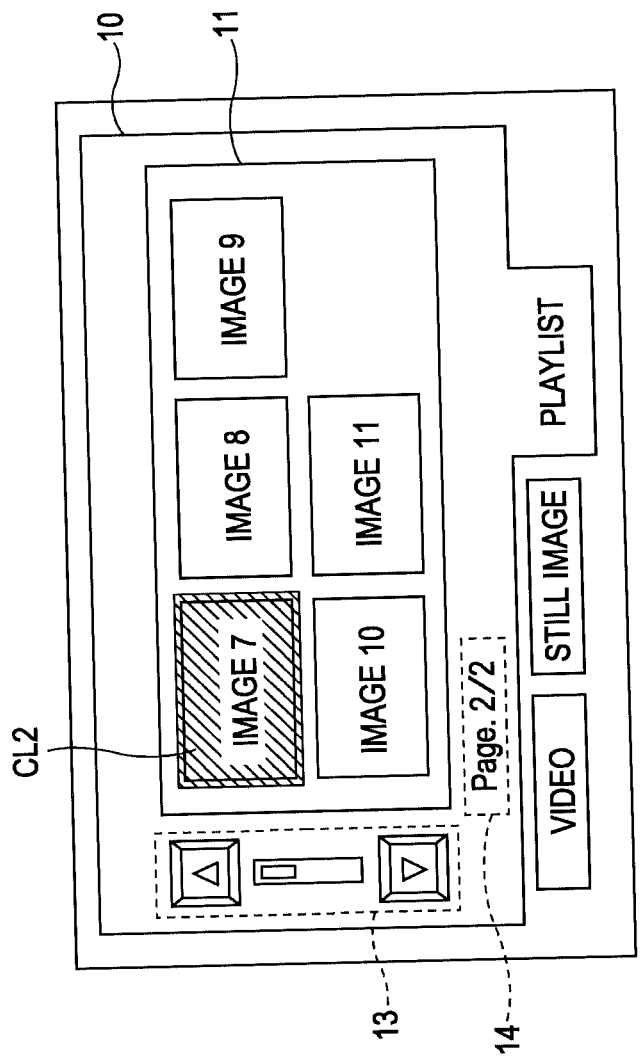

APPARATUS, METHOD, AND PROGRAM FOR SELECTING IMAGE DATA USING A DISPLAY

CROSS REFERENCES TO RELATED APPLICATIONS

This application is a divisional of U.S. application Ser. No. 12/948,130, filed on Nov. 17, 2010, which is a continuation of application Ser. No. 11/637,685, filed on Dec. 12, 2006, which claims priority from Japanese Patent Application JP 2005-380371 filed in the Japanese Patent Office on Dec. 28, 2005, the entire contents of which are incorporated herein by reference.

BACKGROUND OF THE INVENTION

1. Field of the Invention

The present invention relates to an apparatus, a method, and a program for recording an image and, in particular, to a method, and a program for recording an image suitable for managing images captured by, for example, a video camera.

2. Description of the Related Art

Existing video cameras employ a tape storage medium and successively record captured images on the tape storage medium. Accordingly, a user stores the images on a tape medium. To view the images stored on the tape storage medium, the user needs to search for a desired image by playing back the images in the order in which they were captured.

In recent years, video cameras that record images on, for example, a storage medium that allows random access (such as a hard disk) have been introduced into market. In addition, to manage images recorded in such video cameras, a technology is proposed in which the images are divided into small groups based on a minimum unit of data required for accessing the data (refer to, for example, Japanese Unexamined Patent Application Publication No. 2000-270347).

According to such a management method, the maintenance of images stored on the tape storage medium is not needed, and therefore, the search for desired scene in the images by playing back the images in the tape storage medium in the order in which they were captured is not needed.

SUMMARY OF THE INVENTION

However, since the users are not familiar with the grouping of the images in such a management method, the users feel confused or frustrated when editing the captured data.

Accordingly, the present invention provides an apparatus, a method, and a program capable of managing files recorded on the storage medium in a variety of aspects in a user-friendly manner.

According to an embodiment of the present invention, an image recording apparatus includes image capturing means for capturing an image of a subject, recording means for recording one of still image data and video image data captured by the image capturing means on a storage medium in the form of an image file, generating means for generating a management file used for managing the image file recorded on the storage medium, and registering means for registering an identifier of the image file recorded on the storage medium in the management file on a capture date basis in the order of capture time.

Accordingly, this image recording apparatus can automatically group image files on a capture date basis, which usually corresponds to a personal event, for each type of image file. Consequently, this image recording apparatus can manage the image files more effectively than image recording apparatuses that simply manage the image files on a scene-to-scene basis.

According to another embodiment of the present invention, a method for recording an image includes the steps of (a) capturing an image of a subject, (b) recording one of still image data and video image data captured in step (a) on a storage medium in the form of an image file, (c) generating a management file used for managing the image file recorded on the storage medium, and (d) registering an identifier of the image file recorded on the storage medium in the management file on a capture date basis in the order of capture time.

Accordingly, the method according to the embodiment can automatically group the image files on a capture date basis for each type of file. In general, personal events occur on the basis of a date. Therefore, the image files can be effectively managed compared with simply recording on a scene-to-scene basis.

According to still another embodiment of the present invention, a program, executed by a computer, includes program code for performing the steps of (a) controlling image capturing means to capture an image of a subject, (b) controlling recording means to record one of still image data and video image data captured by the image capturing means on a storage medium in the form of an image file, (c) generating a management file used for managing the image file recorded on the storage medium, and (d) registering an identifier of the image file recorded on the storage medium in the management file on a capture date basis in the order of capture time.

Accordingly, the program according to the embodiment can automatically group the image files on a capture date basis for each type of file. In general, personal events occur on the basis of a date. Therefore, the image files can be effectively managed compared with simply recording on a scene-to-scene basis.

According to the embodiments of the present invention, the identifiers of image files recorded on a storage medium are registered in a management file on a capture date basis in the order of capture time. Consequently, the image files can be automatically grouped on a capture date basis for each type of file. In general, personal events occur on the basis of a date. Therefore, the image files can be effectively managed compared with simply recording on a scene-to-scene basis. As a result, an apparatus, a method, and a program for recording an image can be achieved that are capable of managing files recorded on the storage medium in a variety of aspects in a user-friendly manner.

BRIEF DESCRIPTION OF THE DRAWINGS

FIG. 11 is a diagram illustrating an edit operation of the playlist.

DESCRIPTION OF THE PREFERRED EMBODIMENTS

Embodiments of the present invention are described below with reference to the accompanying drawings.

Figure 1:
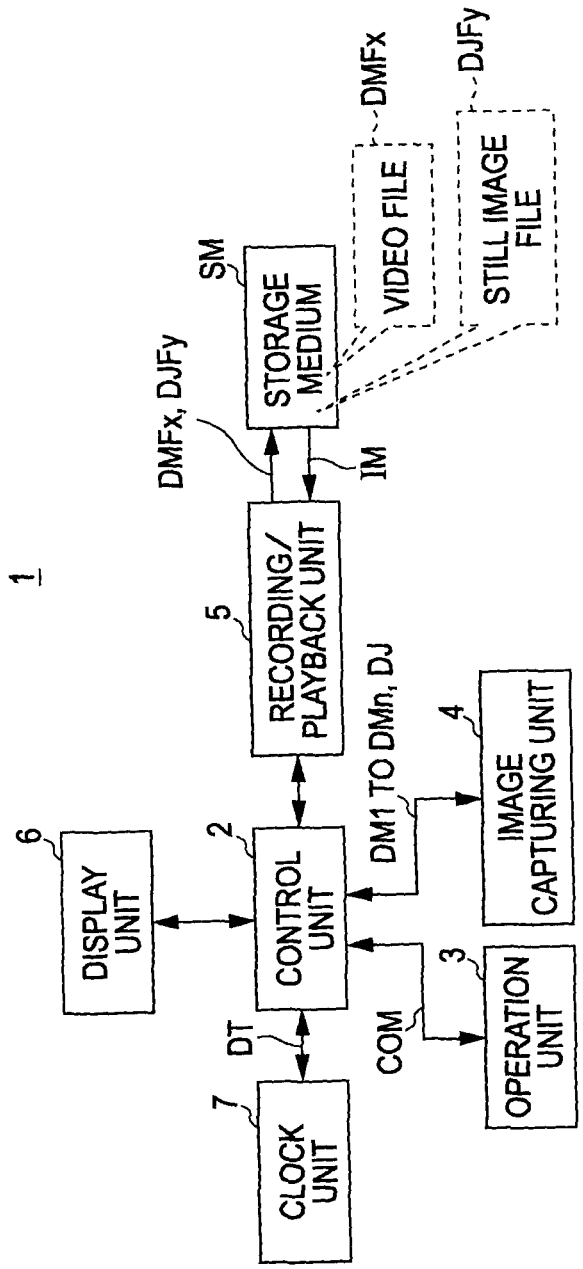
FIG. 1 is a block diagram of a video camera according to an embodiment of the present invention.

(1) Overall Configuration of Video Recording Apparatus According to the Present Embodiment FIG. 1 illustrates the overall structure of a video camera 1 according to the present embodiment. The video camera 1 includes a control unit 2 for performing overall control of the video camera 1. The video camera 1 further includes an operation unit 3, an image capturing unit 4, a recording/playback unit 5, a display unit 6, and a clock unit 7, each being connected to the control unit 2.

The control unit 2 is a computer including a central processing unit (CPU), a read only memory (ROM) storing a variety of programs, and a random access memory (RAM) serving as a work memory of the CPU. A variety of commands COM corresponding to user operations is provided to the control unit 2.

The control unit 2 identifies the user operation on the basis of the provided command COM and, subsequently, performs an operation on the basis of the identified user operation and a program corresponding to the identified user operation.

(1-1) Image Capturing Mode

More specifically, upon detecting a user operation to start capturing video, the control unit 2 controls the image capturing unit 4 and the recording/playback unit 5 to change the operation mode of the video camera 1 to a video capturing mode until the video capturing operation is completed.

In this case, the image capturing unit 4 captures the image of a subject at a predetermined interval from the time the control unit 2 detects the operation to start capturing video to the time the video capturing operation is completed so as to obtain image data items DM1 to DMn (where n is an integer) and sequentially delivers the image data items DM1 to DMn to the control unit 2.

The recording/playback unit 5 encodes the image data items DM1 to DMn sequentially delivered from the image capturing unit 4 via the control unit 2 in accordance with a predetermined encoding method, such as the Moving Picture Experts Group (MPEG) standard. Thereafter, the recording/playback unit 5 records video files DMFx (x=1, 2, 3, . . . m, where m is an integer), which are encoded image data items obtained through the encoding operation, on a storage medium SM mounted at a predetermined location of the video camera 1.

In contrast, upon detecting the user operation to start capturing a still image, the control unit 2 controls the image capturing unit 4 and the recording/playback unit 5 to change the operation mode of the video camera 1 to a still image capturing mode.

In this case, the image capturing unit 4 captures the image of a subject at the time when a user operation to capture a still image is carried out and, subsequently, delivers image data DJ obtained through the capture operation to the control unit 2. The recording/playback unit 5 encodes the image data DJ delivered from the image capturing unit 4 via the control unit 2 in accordance with a predetermined encoding method, such as the Joint Photographic Experts Group (JPEG) standard. Thereafter, the recording/playback unit 5 records the encoded image data on a storage medium SM in the form of a still image file DJFy (y=1, 2, 3, . . . l, where l is an integer).

In this way, the control unit 2 can record an image captured at the time performance of the operation to capture a still image is instructed by a user or record an image captured during the period from the time performance of operation to start capturing video is instructed by a user to the time performance of operation to complete capturing video (hereinafter, the image is referred to as a "scene") is instructed by a user onto the storage medium SM in the form of an individual file.

Here, each of the files recorded on the storage medium SM includes date and time information generated by the built-in clock of the control unit 2 at the time of image capture. Thus, even when the video files DMFx or still image files DJFy recorded on the same day are present, the control unit 2 can identify the order in which the images were captured by referencing the capture times in the date and time information included in the files.

(1-2) Playback Mode

Upon detecting instruction of the operation to play back a video file or a still image file, the control unit 2 controls the image capturing unit 4 and the recording/playback unit 5 to change the operation mode of the video camera 1 to a playback mode.

In this case, the recording/playback unit 5 reads out a file IM specified by the command COM received from the operation unit 3 from among the video files DMFx (x=1–m) or the still image files DJFy (y=1–l) recorded on the storage medium SM.

Subsequently, the recording/playback unit 5 carries out the decoding operation corresponding to the compression encoding method on the readout file IM and delivers the decoded image data DR to the control unit 2.

The display unit 6 digital-to-analog (D/A) converts the image data DR sequentially delivered from the recording/playback unit 5 via the control unit 2 so as to generate image signals. The display unit 6 then displays images on a display screen on the basis of the generated image signals.

Thus, the control unit 2 can play back the images of the video file or the image of the still image file determined depending on the user operation.

(2) Date Management Function

In addition to the above-described configuration, the video camera 1 has a function of managing images of the video files DMFx and the still image files DJFy on the basis of capture date. In practice, the video files DMFx and the still image files DJFy in the video camera 1 are managed on a capture date basis using an image management file.

(2-1) Structure of Image Management File

Figure 2:
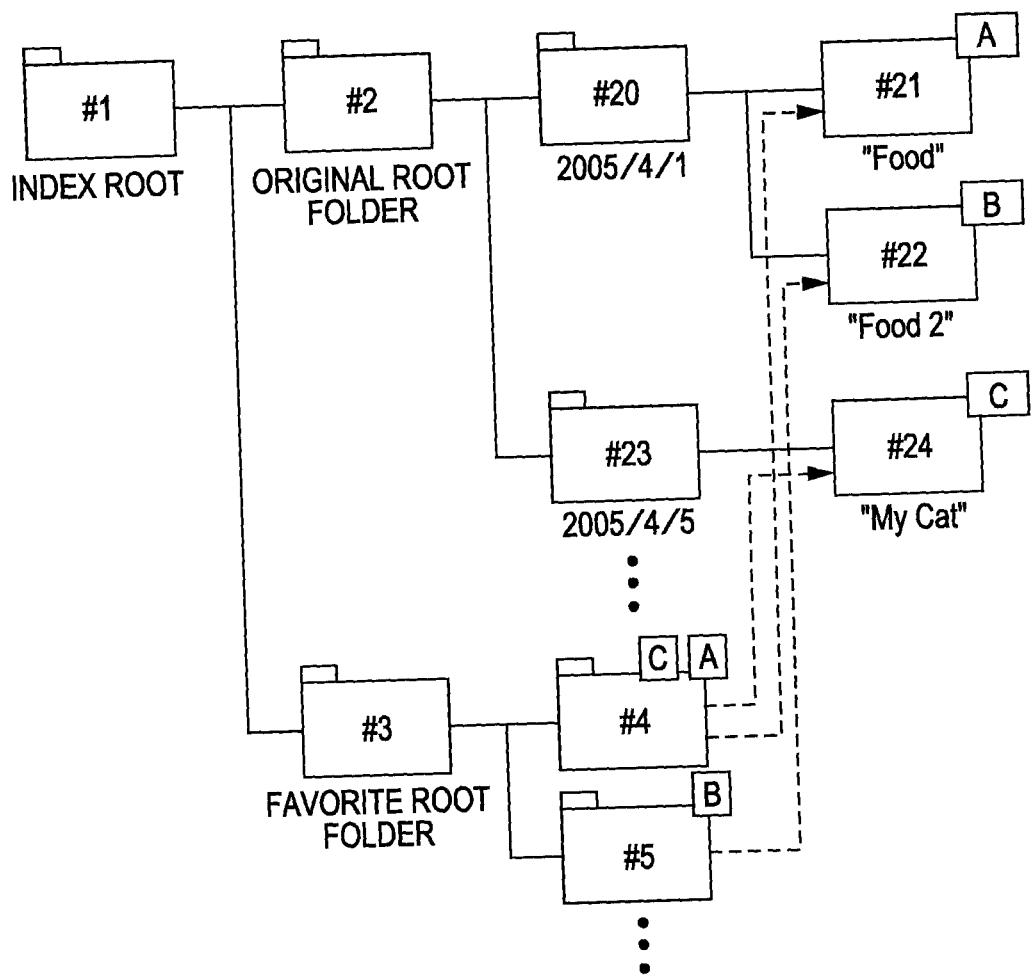
FIG. 2 is a schematic illustration of the structure of an image management file.

As shown in FIG. 2, the image management file has a layered structure known as a tree structure, which has a root directory called an "index root". The index root is the highest layer. As the lower layers, this tree structure has a folder called an "original root folder" (hereinafter simply referred to as an "original folder") and a folder called a "favorite root folder" (hereinafter simply referred to as a "favorite folder").

These root folder, original folder, and favorite folder are created by the control unit 2 when no data are stored on the storage medium SM, for example, when the storage medium SM is formatted or the storage medium SM without any data thereon is mounted at a predetermined mounting location.

A folder having a folder title in a date format (hereinafter referred to as a "date folder") is stored in the original folder. Storing of the date folder in the original folder is referred to as an "entry". Folders that each store information about the files recorded on the storage medium SM on the same date are entered into the date folder in the order of oldest to newest for the scene. Hereinafter, this folder is referred to as a "file information folder".

Figure 3:
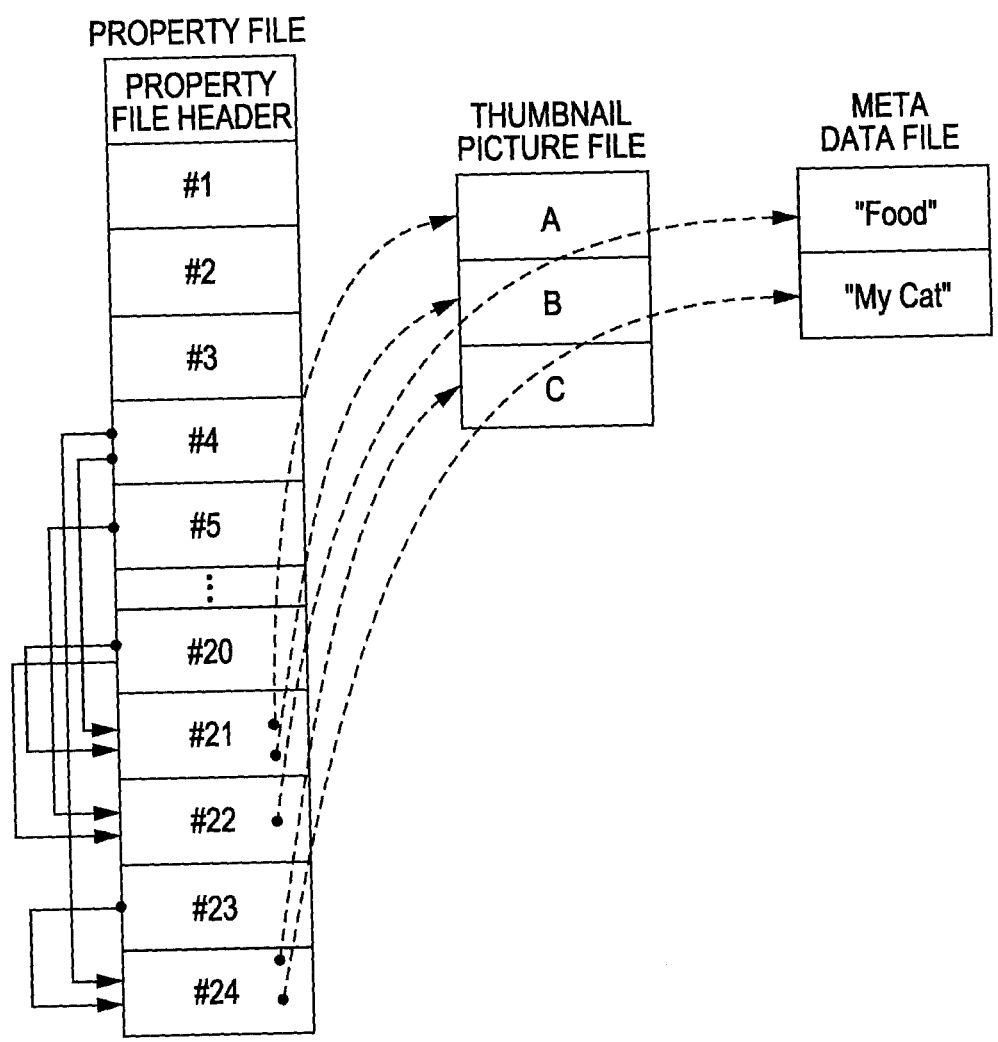
FIG. 3 is a schematic illustration of the recording physical structure of the image management file.

More specifically, for the video files DMFx, the file information folder includes path information to a thumbnail image that is a reduced image of a representative image among a plurality of images of the video files DMFx (see an arrow from the property file to the thumbnail file shown in FIG. 3), path information to the video file DMFx (i.e., information for accessing a video file entity), and path information to attribute information about the video file DMFx (not shown). In contrast, for the still image files DJFy, the file information folder includes path information to a thumbnail image of the still image file DJFy, path information to the still image files DJFy, and path information to attribute information about the still image file DJFy (not shown). Note that the path information is only an example of information for accessing a variety of the above-described information. The files and the information may be identified using an identifier, such as a file number or a file name.

In an example shown in FIG. 2, each of reference symbols "A", "B", and "C" denotes a thumbnail image. Each of the folder titles "Food", "Food 2", and "My Cat" denotes the file identifier. It should be noted that the user can change these folder titles through an edit operation.

In this way, the information (file information) about images captured for a scene is sequentially entered into the original folder on the basis of capture date in the order of oldest to newest.

In the video camera 1, the "date" is used only for grouping the file information and the file information is entered in the order in which images are captured. Accordingly, even when the built-in clock of the video camera 1 gains or loses time, a problem that affects the management does not occur.

In contrast, the favorite folder includes two types of folder selected from among one or more file information folders in the lower layer of the date folder: a folder (hereinafter referred to as a "video playlist folder") that stores information about the video files DMFx selected to be continuously played back and a folder (hereinafter referred to as a "still image playlist folder") that stores information about the still image files DJFy selected to be continuously played back. Like the root folder, these folders are generated by the control unit 2 when no data are recorded on the storage medium SM.

Link information to the file information folder corresponding to the file selected to be continuously played back is sequentially entered into one of these folders in the selected order.

In the example shown in FIG. 2, the link information to the file information folder "My Cat" corresponding to the file stored in the folder "2005/4/5" and the link information to the file information folder "Food", which is one of the file information folders "Food" and "Food 2" corresponding to the file stored in the folder "2005/4/1", are entered in the selected order (i.e., "My Cat" first and then "Food"). Additionally, only link information to the file information folder "Food 2", which is one of the file information folders "Food" and "Food 2" corresponding to the file stored in the folder "2005/4/1", is entered in the still image playlist folder.

Accordingly, in this example, when the images in the video playlist folder are played back, the image groups of the video files DMFx corresponding to "My Cat" and "Food" are sequentially played back (i.e., "My Cat" first and then "Food"). In contrast, when the image in the still image playlist folder is played back, the images associated with the still image files DJFy corresponding to "Food 2" are played back.

As noted above, only the link information to files selected by the user as files to be sequentially played back from among the link information to files, each corresponding to one or more scenes grouped on the basis of date, are entered into the playback folder in the order of selection (i.e., in the order of entry) for each type.

When physically recorded on the storage medium SM, the actual file structure of the image management file is shown in FIG. 3. That is, the image management file includes a property file, a thumbnail file, and a meta data file. The reference relationship among registered entries in the property file is schematically shown in FIG. 2.

In this property file, an entry "#4" is related to a video playlist. In this embodiment, the identifiers of the entries #21 and #24 for video files are stored in this entry. An entry "#5" is related to a still image playlist. In this embodiment, the identifier of the still image file entry #22 is stored in this entry. In the entries for the video file and the still image file, path information used for accessing the corresponding thumbnail image (e.g., "A", "B", or "C") in the thumbnail picture file and path information used for accessing the corresponding meta data (e.g., "Food" or "My Cat") in the meta data file are stored. Additionally, an entry "#20" stores the identifiers of the entries for a video file and a still image file captured on "2005/4/1". Here, the video file entry #21 and the still image file entry #22 are indicated by the identifiers. An entry "#23" stores identifiers of an entry for a video file and a still image file captured on "2005/4/5". Here, the video file entry #24 is indicated by the identifier.

(2-2) Entry Processing

The entry processing for the above-described image management file is performed by the control unit 2. This entry processing performed by the control unit 2 (see FIG. 1) is described below for the date folder, the file information folder, and the playlist folder.

(2-2-1) Entry Processing for Date Folder and File Information Folder

When detecting that the video capture start operation or the still image capture start operation is to be carried out, the control unit 2 controls the image capturing unit 4 and the recording/playback unit 5. In addition, the control unit 2 controls the clock unit 7 to acquire the date on which the control unit 2 detects initiation of the start operation as data DT (hereinafter referred to as "date data").

Here, the control unit 2 references the image management file stored on the storage medium SM using the recording/playback unit 5. If a folder having a title name based on the date data DT is not found, the control unit 2 creates a folder having a title name based on the date data DT. In addition, the control unit 2 creates a file information folder having a title name based on a default character string. The control unit 2 then enters these folders in the image management file.

However, if a folder having a title name based on the date data DT is found, the control unit 2 creates only a file information folder. The control unit 2 then enters this folder in the image management file.

Note that if an image management file has not been recorded on the storage medium SM, the control unit 2 creates a root directory, an original folder, a favorite folder, a video playlist folder, and a still image playlist folder on the storage medium SM as an initial image management file.

In addition, after the entry operation of the file information folder is made, if video data (i.e., image data items DM1 to DMn) are delivered from the image capturing unit 4 in response to the control of the image capturing unit 4, the control unit 2 reduces, for example, the first image data DM1 to a predetermined image size. This reduced image is used as a thumbnail image.

In contrast, if still image data (i.e., image data DJ) is delivered from the image capturing unit 4, the control unit 2 reduces the image data DJ to a predetermined image size. This reduced image is used as a thumbnail image.

Subsequently, the control unit 2 stores the reduced image data (hereinafter referred to as "thumbnail image data") in the file information folder and also stores the file identifier of this file.

In this way, the control unit 2 can automatically group the files on a capture date basis for each type of file.

(2-2-2) Entry Processing for Playlist Folder

Figure 4:
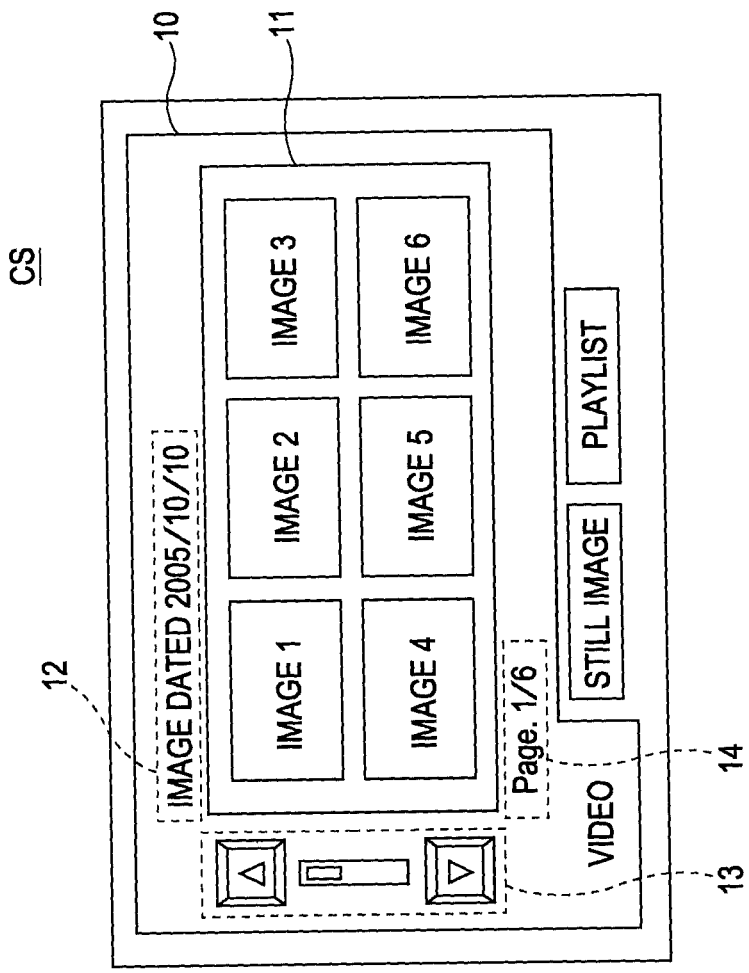
FIG. 4 illustrates an exemplary selection screen.

Upon detecting the entry operation to the playlist folder, the control unit 2 controls the image capturing unit 4 and the recording/playback unit 5 to display a selection screen CS shown in FIG. 4 on the basis of the image management file recorded on the storage medium SM.

Figure 5:
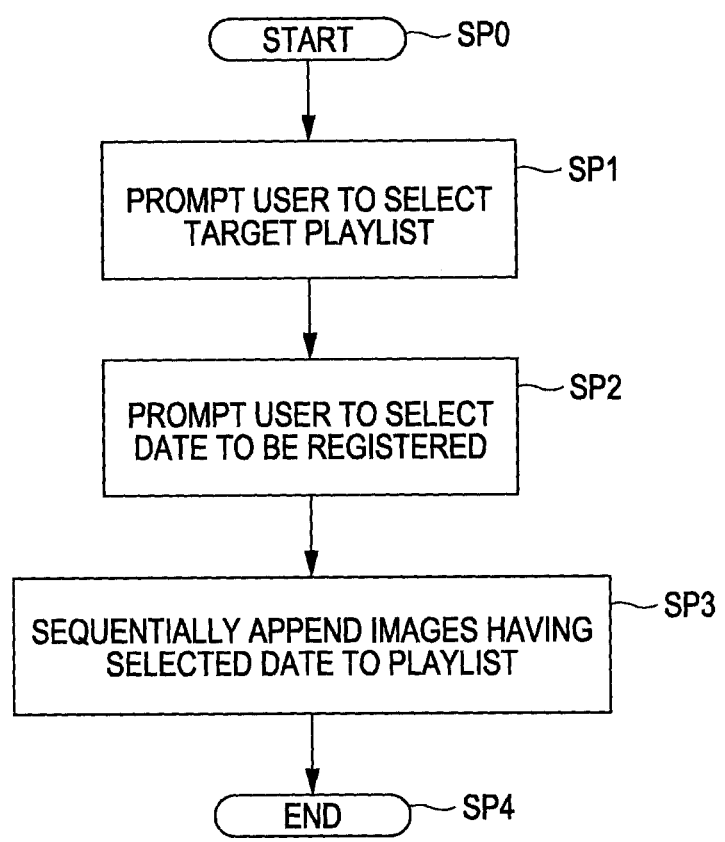
FIG. 5 is a flow chart of the entry processing of a playlist on a capture date basis.

More specifically, the control unit 2 starts entry processing of the playlist folder (step SP0 shown in FIG. 5). First, the control unit 2 displays menu items (i.e., "VIDEO", "STILL IMAGE", and "PLAYLIST"). Simultaneously, the control unit 2 selects the "VIDEO" menu item by default and displays a detailed video menu items in a detail display section 10 used for displaying the details of the selected menu item.

Subsequently, the control unit 2 displays one or more thumbnail images stored in an image-related folder in the lower layer of the date folder in an image display section 11, which is located in the middle of the detail display section 10. In addition, the control unit 2 displays the earliest date among the dates of the corresponding date folders in a date display section 12, which is provided above the image display section 11.

Furthermore, if all of the thumbnail images cannot be displayed in the image display section 11 at the same time, the control unit 2 changes a scroll operation section 13 used for scrolling the thumbnail images displayed in the image display section 11 from an inactive display state, which represents an unusable state, to an active display state, which represents a usable state. Simultaneously, the control unit 2 displays the total number of scrollable pages and the page number of the currently displayed page in a page display section 14.

Figure 6:
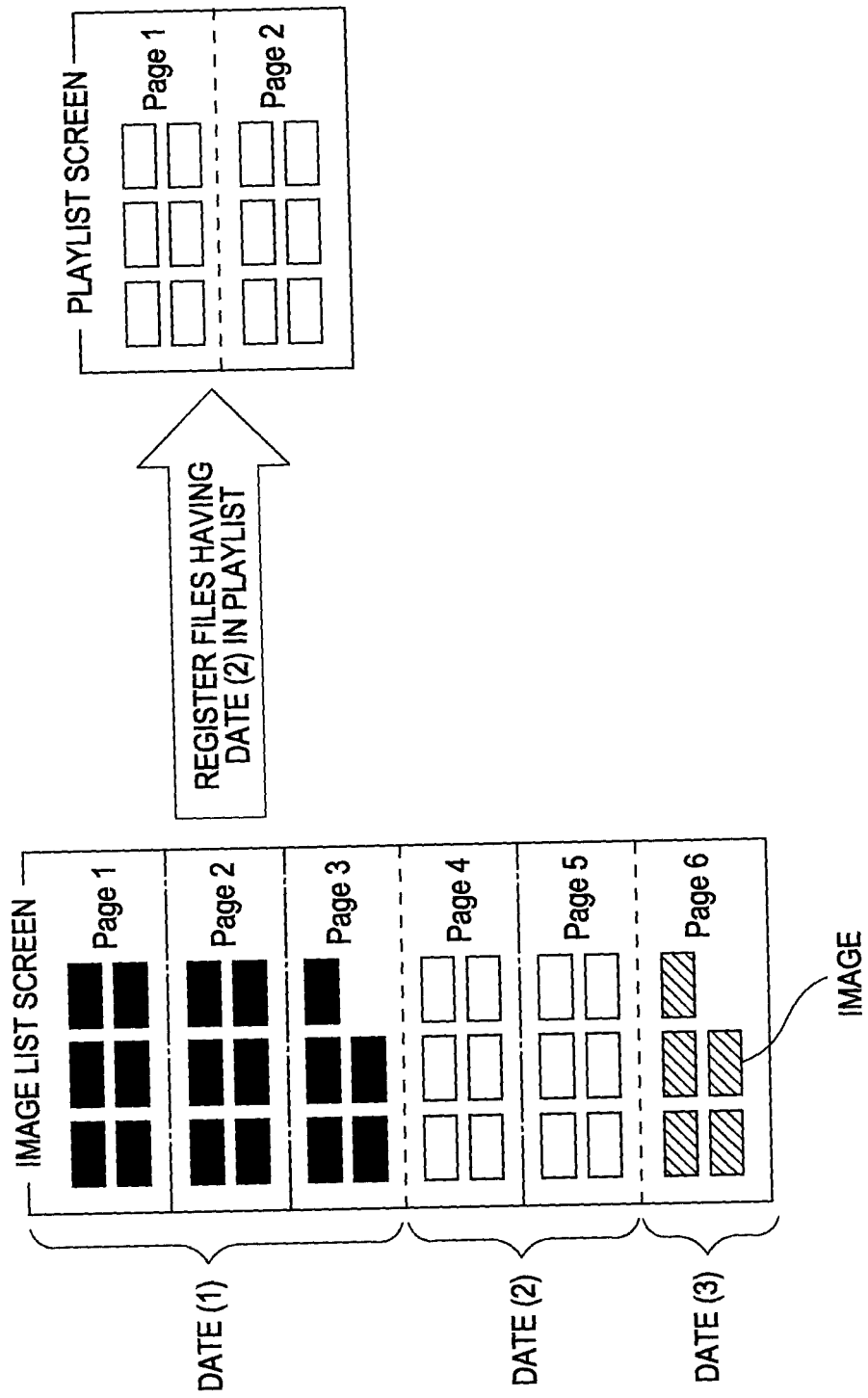
FIGS. 6A and 6B are diagrams illustrating displayed images and a process for registering a file in the playlist.

For example, suppose, as shown in FIG. 6A, seventeen scenes are captured on some day (i.e., a date (1)) first, and then twelve scenes are captured on a date (2). Thereafter, five scenes are captured on a date (3). In such a case, the control unit 2 does not display any image at the location for the nonexistent eighteenth scene of the date (1), which is on the third page for the date (1), instead of displaying the thumbnail image of the first scene of the date (2). Thus, the space at that location is left blank. Similarly, the control unit 2 does not display any image at the location for the nonexistent sixth scene of the date (3), which is on the first page for the date (3), instead of displaying the thumbnail image of the first scene of the date (4) to be captured later. Thus, the space at that location is left blank.

As noted above, by displaying the thumbnail images in the order of oldest to newest on a capture date basis via the selection screen CS, the control unit 2 can visually emphasize that the scenes are displayed on a capture date basis (i.e., on an event-to-event basis).

Thus, the control unit 2 switches the display of the detail display section 10 between the "video" menu items and the "still image" menu items in response to the user operation on the operation unit 3 (see FIG. 1), so that the user can select the entry in the video playlist folder or in the still image playlist folder (step SP1 in FIG. 5).

Figure 7:
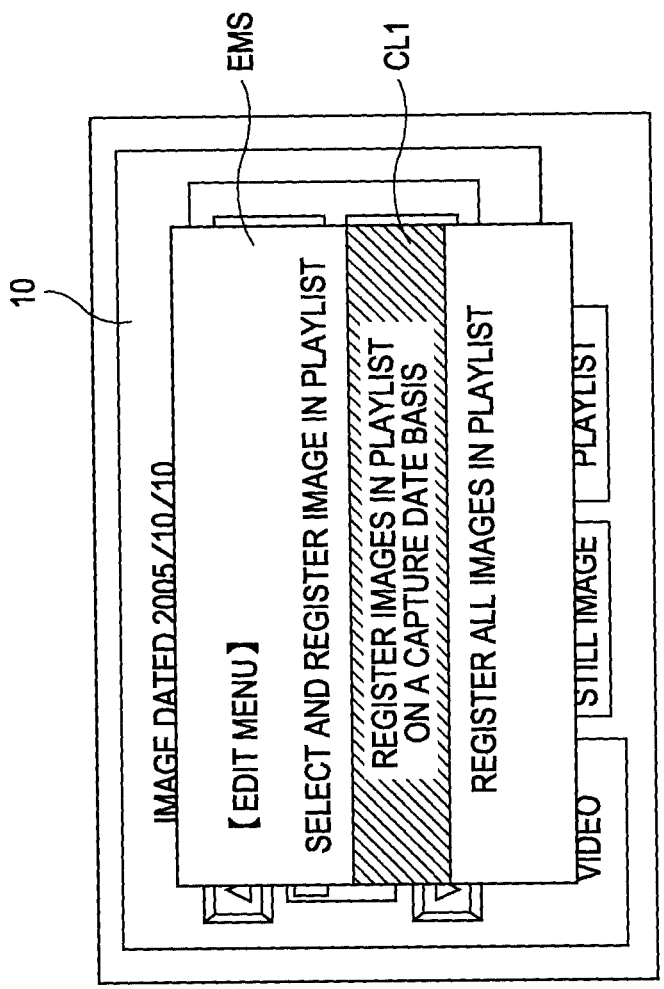
FIG. 7 illustrates an exemplary edit menu screen.

For example, upon detecting that the user has instructed setting of a playlist by operating a menu button when the detail display section 10 displays the video menu items, the control unit 2 determines that the entry of the video playlist folder is selected. Subsequently, as shown in FIG. 7, the control unit 2 displays an edit menu screen EMS including three edit menu items "Select and register image in the playlist", "Register images in playlist on a capture date basis", and "Register all images in playlist", and a selection cursor CL1 for selecting one of these three edit menu items.

Figure 8:
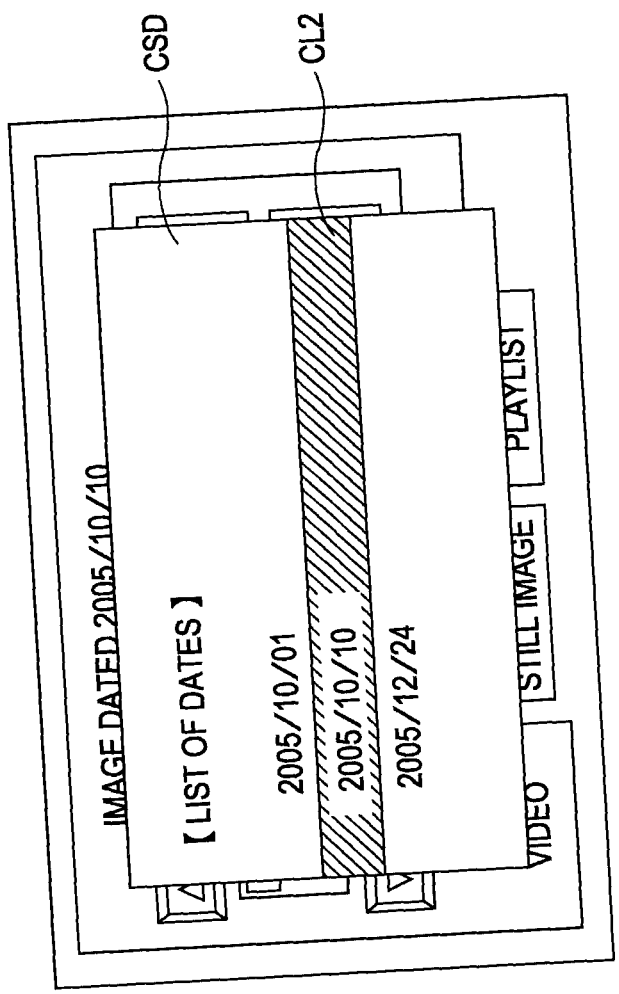
FIG. 8 illustrates an exemplary date selection screen.

Here, upon detecting that the edit menu item "Register images in playlist on a capture date basis" is selected, the control unit 2 determines that the video playlist folder is selected. Subsequently, as shown in FIG. 8, by displaying a screen (hereinafter referred to as a "date selection screen") CSD including the list of the date folders entered in the lower layers of the original root folder in the order of oldest to newest in the detail display section 10 together with a selection cursor CL2 for selecting the date, the control unit 2 allows the user to select the date to be added to the video playlist folder (step SP2 in FIG. 5).

Figure 9:
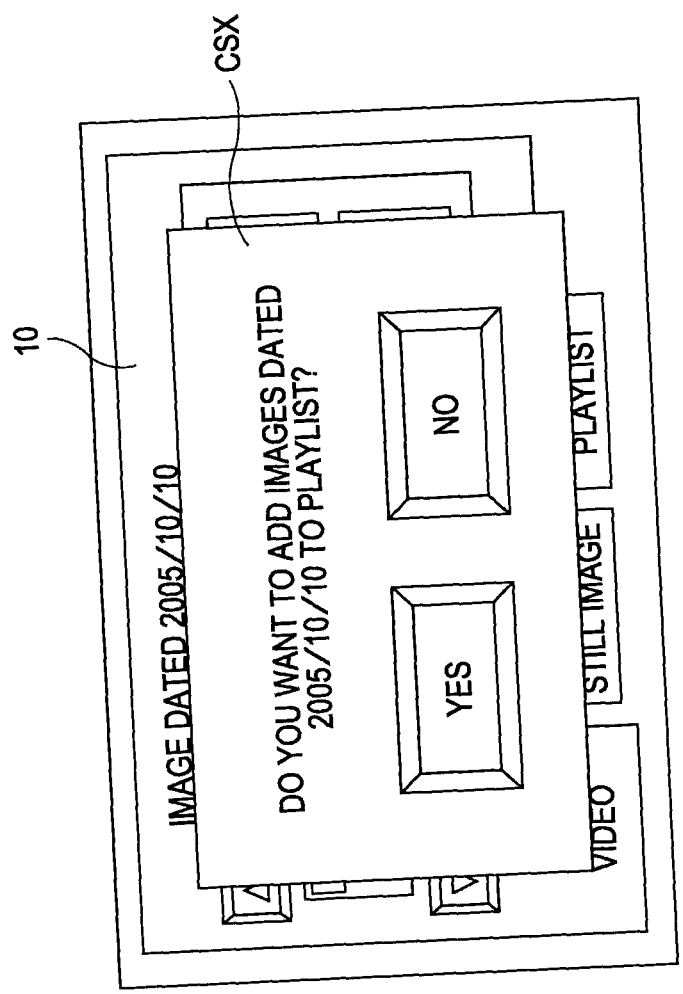
FIG. 9 illustrates an exemplary confirmation screen.

Thereafter, upon detecting that the selection operation of the date has been carried out, the control unit 2 displays a confirmation screen CSX shown in FIG. 9 in the detail display section 10 in order to determine whether the control unit 2 is allowed to add the image having the selected date to the playlist. Upon detecting initiation of the operation to add the image to the playlist, the control unit 2 sequentially creates the entries of the link information to all the file information folders in the lower layer of the date folder having the selected date of scene in the order of oldest to newest in the video playlist folder (step SP3 in FIG. 5).

At that time, if link information to a different file information folder has already been entered in the video playlist folder, the control unit 2 creates the entry of the link information to be entered next to the existing link information.

Figure 10:
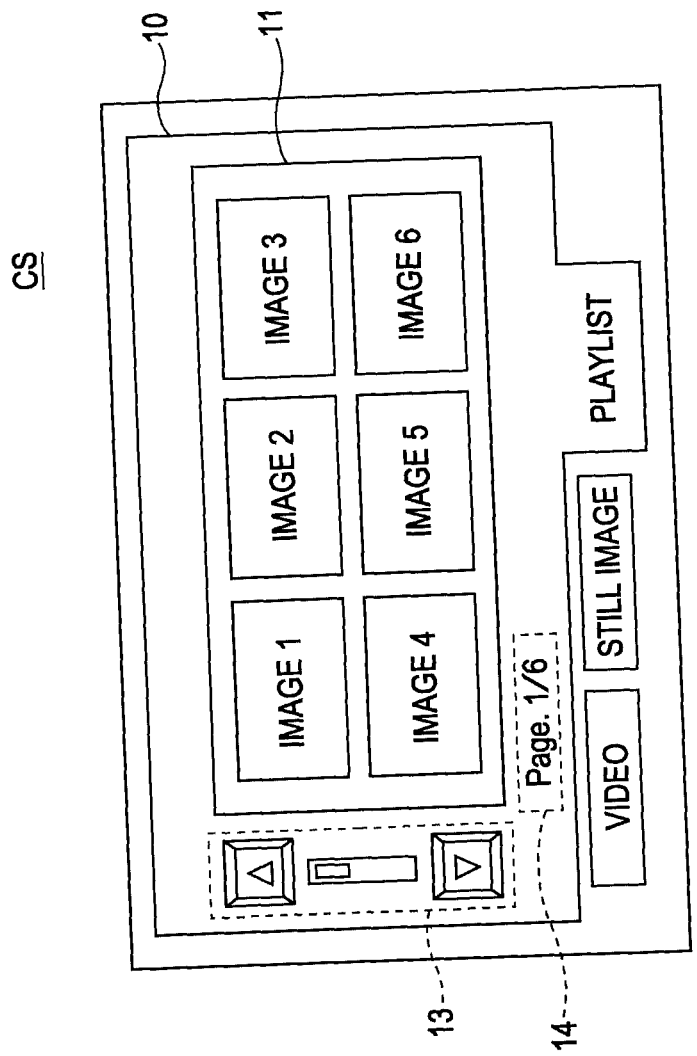
FIG. 10 is a diagram illustrating a playlist screen.

Additionally, as shown in FIG. 10, simultaneously with this entry, the control unit 2 displays the detailed playlist menu items in the detail display section 10 and displays a thumbnail image corresponding to the selected date in the image display section 11 of the detail display section 10. Thereafter, the entry processing of the playlist folder is completed (step SP4 in FIG. 5).

In the example shown in FIG. 6A, when the date (2) is selected, the control unit 2 enters link information to the file information folders having the date (2) in the video playlist folder in the order of earliest time of the scene first, as shown in FIG. 6B. Also, the control unit 2 displays the thumbnail images corresponding to the date (2) in the detail display section 10 as a playlist screen.

In contrast, upon detecting that the edit item "Select and register image in the playlist" is selected, the control unit 2 prompts the user to select the date to be added to the video playlist folder via the date selection screen CSD (see FIG. 8). Thereafter, the control unit 2 displays a selection cursor (not shown) for selecting a thumbnail image having the selected date in the image display section 11. Thus, the user selects individual thumbnail images in the image display section 11. The control unit 2 puts entries of the link information to the file information folders corresponding to the selected thumbnail images in the video playlist folder. Simultaneously, the control unit 2 displays the selected thumbnail images in the detail display section 10 as a playlist screen.

At that time, if link information to a different file information folder has already been entered in the video playlist folder, the control unit 2 creates the entry of the link information to be entered next to the existing link information, as in the case of "Register images in playlist on a capture date basis".

However, upon detecting that the edit item "Register all images in playlist" is selected, the control unit 2 puts entries of link information to all the file information folders in the lower layers of the one or more date folders in the video play list folder in the order of oldest to newest of the scene. Also, the control unit 2 displays all the thumbnail images in the detail display section 10 as a playlist screen.

At that time, if link information to a different file information folder has already been entered in the video playlist folder, the control unit 2 creates the entry of the link information to be entered next to the existing link information, as in the case of "Select and register image in playlist".

Additionally, if the control unit 2 detects that the entry operation of the playlist is carried out after the "video" menu items has been changed to the "still image" menu items in the detail display section 10, the control unit 2 puts entries of link information to the selected file information folder in the still image playlist folder, as in the entry operation relating to the "video".

In this way, the control unit 2 can further categorize the files automatically grouped on a capture date basis into different groups in response to performance of the selection operation instructed by the user. That is, in addition to an image-to-image basis and an all-image basis, the group can be created on a capture date basis, which is suitable for remembering a personal event, for each type of file.

Accordingly, for the video camera 1, the user can group the files on an event-to-event basis using a date. In addition, the user can further group the files that the user frequently wants to view. Thus, the user can select and keep the files for the event that the user frequently wants to view. However, the user can also keep the other files for the event just in case the user wishes to view them.

(2-2-3) Edit Operation of Playlist Folder

The edit operation of a playlist folder performed by the control unit 2 is described next. However, since the edit operation of a still image playlist folder is similar to that of a video playlist folder, only the edit operation of a video playlist folder is described here.

Upon detecting that the edit operation of a video playlist is to be carried out, the control unit 2 displays menu items "video", "still image", and "playlist". In addition, the control unit 2 displays detailed playlist menus in the detail display section 10, as shown in FIG. 11. Note that the same reference numerals are used in both FIGS. 3 and 11 to identify the same elements.

Subsequently, the control unit 2 displays one or more thumbnail images stored in a file information folder entered in the video playlist in an image display section 11, which is located in the middle of the detail display section 10, in the order of earliest entry first. In addition, the control unit 2 displays the selection cursor CL2 for selecting one of the thumbnail images.

For example, if the first entry of the video playlist is based on a capture date basis, the control unit 2 displays thumbnail images stored in the file information folder, which is entered on a capture date basis, in the image display section 11. At that time, if all of the thumbnail images cannot be displayed in the image display section 11 at the same time, the control unit 2 changes the scroll operation section 13 to an active display state and displays the total number of scrollable pages and the page number of the currently displayed page in the page display section 14.

For example, in FIG. 11, eleven thumbnail images indicated by the link information in the first entry of the video playlist folder are shown. As can be seen from FIG. 11, the control unit 2 does not display any image in a space corresponding to the twelfth image position on page 2 in the image display section 11, instead of displaying the thumbnail image indicated by the link information in the second entry of the video playlist folder. Thus, the space at that position is left blank. In this way, the control unit 2 visually emphasizes that the thumbnail images are displayed on a capture date basis while displaying the thumbnail images in the order of oldest to newest.

At that time, upon detecting that a delete operation is to be carried out, the control unit 2 deletes the link information to the file information folder corresponding to the thumbnail image selected by means of the selection cursor CL2 from the video playlist folder.

In contrast, upon detecting that a change operation of the entry order is to be carried out, the control unit 2 prompts the user to select two thumbnail images to be exchanged by means of the selection cursor CL2. Thereafter, the control unit 2 changes the entry orders of the link information corresponding to the selected thumbnail images.

Thus, the control unit 2 can edit the files grouped for successive playback in response to the selection operation performed by the user.

In this way, for the video camera 1, the user can further categorize the files grouped on a capture date basis for each personal event into different groups of files that the user frequently wants to view. Furthermore, by appropriately changing the order in which the files are played back or deleting the file, the user can view the video that matches their preference.

Here, for example, suppose a user shoots a video at personal events such as an athletic meet and a Christmas party using the video camera 1. In this case, the captured images (scenes) are automatically grouped on the basis of the date (the date of the athletic meet or the date of the Christmas party) in the order of oldest to newest. After the scenes are captured, the user can group the images corresponding to the scenes that contain their child as images to be successively played back and appropriately edit the images. Thus, the user can view successively played back images (i.e., video) that mainly shows their child.

(2-2-4) Transfer Process of Playlist

The transfer process of a playlist performed by the control unit 2 is described next. However, since the transfer process of a still image playlist folder is similar to that of a video playlist folder, only the transfer process of a video playlist folder is described here.

Upon detecting that the transfer operation of a video playlist is to be carried out, the control unit 2 references the targets indicated by the link information in all the entries of the video playlist folder so as to arrange the thumbnail images stored in the file information folders in the order of selection. Thus, the control unit 2 generates display data shown in the image display section 11 of FIG. 11.

Subsequently, the control unit 2 transmits the display data together with the video files DMFx corresponding to the thumbnail images of the display data to, for example, a personal computer via an interface (not shown). The display data can be used as information items of the personal event on a web page or index data when a video is recorded on a digital versatile disc (DVD).

As noted above, the control unit 2 can transfer the display data used for information items of the personal event on a web page or index data when a video is recorded on a digital versatile disc (DVD) to, for example, a personal computer that edits the video on the basis of the playlist.

(3) Summary

In the above-described configuration, the video camera 1 records an image captured when a still image capture operation is carried out on the storage medium SM as a still image file DJFy (see FIG. 1). In addition, the video camera 1 records a plurality of images captured from the time when a video capture start operation is carried out to the time when a video capture end operation is carried out on the storage medium SM as a video file DMFx (see FIG. 1).

Here, the video camera 1 has a function of making an entry (see FIG. 2) of the identifier of the video file DMFx or the still image file DJFy on a capture date basis in the order of capture time each time the file is recorded on the storage medium SM.

Accordingly, the video camera 1 can automatically group the files on a capture date basis for each type of file. In general, personal events occur on the basis of a date. Therefore, the files can be effectively managed compared with simply recording on a scene-to-scene basis. Thus, the ease of use at a playback time can be increased.

Furthermore, in the image management file, the file identifier of a file and the thumbnail image of the file are entered on a capture date basis in the order of capture time. In addition, the video camera 1 has a function of displaying the selection screen CS (see FIG. 4) for selecting the files recorded on the storage medium SM on a capture date basis using the thumbnail images and the edit menu screen EMS (see FIG. 7) on the display unit 6. This function allows the identifier of the video file DMFx or the still image file DJFy having the date that is the same as the date selected via the displayed screen and the thumbnail image corresponding to the file to be entered in the order of selection.

Accordingly, the video camera 1 can further categorize the files automatically grouped on a capture date basis into a different group in response to the selection operation performed by a user. Therefore, the user can effectively manage the files while keeping the management on the basis of a date. Thus, the ease of use at a playback time can be further increased.

Additionally, since the video camera 1 stores the thumbnail images in the image management file, the control unit 2 can decrease the time required for finding the desired thumbnail image compared with the design in which the thumbnail images are placed in an area other than the image management file. As a result, the video camera 1 can decrease the time required for displaying the selection screen CS (see FIG. 4) on the display unit 6 on the basis of the thumbnail images. Thus, the time a user is required to wait before the screen appears can be decreased.

Furthermore, the video camera 1 has a function of deleting some of the identifiers and thumbnail images having a predetermined date and being entered in the order of selection in response to performance of the selection operation instructed by the user. Alternatively, the video camera 1 has a function of changing the order of selection.

Accordingly, the video camera 1 can edit the files grouped in accordance with performance of the selection operation instructed by the user. Thus, the user can further manage the files depending on the user's preference.

According to the above-described configuration, each time the video file DMFx or the still image file DJFy is recorded on the storage medium SM, the identifier of that file is entered (see FIG. 2) in the image management file on a capture date basis in the order of capture time. Therefore, the video camera 1 can automatically group the files on a capture date basis for each type of file. In general, personal events occur on the basis of a date. Therefore, the video camera 1 can effectively manage the files recorded on the storage medium SM so as to be friendly to users.

(4) Other Exemplary Embodiments

In the above-described exemplary embodiments, when the edit item "register images in the playlist on a capture date basis" is selected in the edit menu screen EMS (see FIG. 7), the date selection screen CSD (see FIG. 8) of the entered date is displayed. Thereafter, it is asked whether an image having the date selected via the date selection screen CSD is added to the playlist using the confirmation screen CSX (see FIG. 9). However, the present invention is not limited thereto. Alternatively, when the selection operation is performed, it may be considered that the date displayed in the date display section 12 at that time is selected. Thus, it may be asked whether an image having that date is added to the playlist using the confirmation screen CSX (see FIG. 9).

Additionally, in the above-described exemplary embodiments, one video playlist and one still image playlist are created in the lower layer of the favorite folder in the image management file (see FIG. 2). However, the present invention is not limited thereto. Alternatively, these playlists may be created in response to the setting operation performed by a user.

More specifically, before the control unit 2 makes an entry in the file information folder in the video playlist folder or the still image playlist folder, the control unit 2 may display a screen on the display unit 6 for prompting a user to select whether the existing playlist or a newly created playlist is entered. On the basis of the selection result, the control unit 2 can make the entry in the target file information folder.

In this way, a playlist that further meets the user's preference can be created compared with the above-described embodiment in which the playlist is simply separated depending on the type of file.

Furthermore, in the above-described exemplary embodiments, the present invention is applied to the video camera 1. However, the present invention is applicable to a variety of image recording apparatuses, image playback apparatuses, or image recording/playback apparatuses having a function of processing an image. Examples of such apparatuses include a personal computer, a personal digital assistant (PDA), a hard disk recorder (HDR), and a digital still camera.

It should be understood by those skilled in the art that various modifications, combinations, sub-combinations and alterations may occur depending on design requirements and other factors insofar as they are within the scope of the appended claims or the equivalents thereof.

What is claimed is:

1. An image playback apparatus comprising:
   an arranging unit to arrange sequentially a plurality of thumbnail images of image files on a capture date basis; and
   a display control unit to control:
      display of the plurality of thumbnail images, wherein the thumbnail images corresponding to different capture dates are displayed separately,
      scrolling the display of the plurality of thumbnail images arranged on a capture date in accordance with the different capture dates, in which the scrolling scrolls across a display section at least one thumbnail image corresponding to a first capture date of the different captures dates followed next by at least one thumbnail image corresponding to a second capture date of the different capture dates, the thumbnail images corresponding respectively to the different capture dates being displayed separately during the scrolling such that a same line on the display section for display of thumbnail images does not include a thumbnail image corresponding to the first capture date and a thumbnail image corresponding to a capture date different from the first capture date, and display a screen for selection by a user of a capture date of the different capture dates in the display section in which the plurality of thumbnail images is displayed.

2. The image playback apparatus according to claim 1, wherein the display control unit is to arrange the thumbnail images having a same capture date in lines, and when a last line of the lines is available for arranging the thumbnail images having the same capture date and there is no further unarranged thumbnail image having the same capture date, not to display in the last line the thumbnail images having a capture date different from the same capture date.

3. The image playback apparatus according to claim 2, wherein the display control unit, when a location of the last line is available for arranging the thumbnail images having the same capture date and there is no further unarranged thumbnail image having the same capture date, is not to display in the last line the thumbnail images having a capture date different from the same capture date and to leave the location blank.

4. The image playback apparatus according to claim 3, wherein the display control unit is to display a position of a currently displayed page within a plurality of pages.

5. The image playback apparatus according to claim 4, wherein the display control unit is to change a scroll operation section to an active display state if all of the thumbnail images having the same capture date cannot be displayed on a same page.

6. The image playback apparatus of claim 1, wherein the display control unit is to control successive play back of images on a capture date basis based on selection of a thumbnail of the plurality of thumbnails displayed on a capture date basis.

7. The image playback apparatus of claim 1 further comprising:
a control unit to control transfer to an external device, via an interface, of the image files on a capture date basis.

8. A method for displaying an image comprising:
arranging sequentially a plurality of thumbnail images of image files on a capture date basis;
displaying the plurality of thumbnail images, wherein the thumbnail images corresponding to different capture dates are displayed separately;
scrolling the display of the plurality of thumbnail images arranged on a capture date in accordance with the different capture dates, in which the scrolling scrolls across a display section at least one thumbnail image corresponding to a first capture date of the different captures dates followed next by at least one thumbnail image corresponding to a second capture date of the different capture dates, the thumbnail images corresponding respectively to the different capture dates being displayed separately during the scrolling such that a same line on the display section for display of thumbnail images does not include a thumbnail image corresponding to the first capture date and a thumbnail image corresponding to a capture date different from the first capture date; and displaying a screen for selection by a user of a capture date of the different capture dates in the display section in which the plurality of thumbnail images is displayed.

9. The method for displaying an image according to claim 8 further comprising:
arranging the thumbnail images having a same capture date in lines, and
when a last line of the lines is available for arranging the thumbnail images having the same capture date and there is no further unarranged thumbnail image having the same capture date, not displaying in the last line the thumbnail images having a capture date different from the same capture date.

10. The method for displaying an image according to claim 9,
wherein, when a location of the last line is available for arranging the thumbnail images having the same capture date and there is no further unarranged thumbnail image having the same capture date, not displaying in the last line the thumbnail images having a capture date different from the same capture date and leaving the location blank.

11. The method for displaying an image according to claim 10 further comprising:
displaying a position of a currently displayed page within a plurality of pages.

12. The method for displaying an image according to claim 11 further comprising:
changing a scroll operation section to an active display state if all of the thumbnail images having the same capture date cannot be displayed on a same page.

13. A non-transitory recording medium recorded with a program executable by a computer, the program comprising:
arranging sequentially a plurality of thumbnail images of image files on a capture date basis;
displaying the plurality of thumbnail images, wherein the thumbnail images corresponding to different capture dates are displayed separately;
scrolling the display of the plurality of thumbnail images arranged on a capture date in accordance with the different capture dates, in which the scrolling scrolls across a display section at least one thumbnail image corresponding to a first capture date of the different captures dates followed next by at least one thumbnail image corresponding to a second capture date of the different capture dates, the thumbnail images corresponding respectively to the different capture dates being displayed separately during the scrolling such that a same line on the display section for display of thumbnail images does not include a thumbnail image corresponding to the first capture date and a thumbnail image corresponding to a capture date different from the first capture date; and displaying a screen for selection by a user of a capture date of the different capture dates in the display section in which the plurality of thumbnail images is displayed.

14. The non-transitory recording medium according to claim 13, the program further comprising:
arranging the thumbnail images having a same capture date in lines, and
when a last line of the lines is available for arranging the thumbnail images having the same capture date and there is no further unarranged thumbnail image having the same capture date, not displaying in the last line the thumbnail images having a capture date different from the same capture date.

15. The non-transitory recording medium according to claim 14, the program further comprising:

when a location of the last line is available for arranging the thumbnail images having the same capture date and there is no further unarranged thumbnail image having the same capture date, not displaying in the last line the thumbnail images having a capture date different from the same capture date and leaving the location blank.

16. The non-transitory recording medium according to claim 15, the program further comprising:

displaying a position of a currently displayed page within a plurality of pages.

17. The non-transitory recording medium according to claim 16, the program further comprising:

changing a scroll operation section to an active display state if all of the thumbnail images having the same capture date cannot be displayed on a same page.

* * * * *